I. BERDAN.
Sulky for Plows.

No. 205,827. Patented July 9, 1878.

WITNESSES
Saml R. Turner
W. J. Osgood.

By

INVENTORS
Isaac Berdan
R. S. & A. P. Lacey Attorneys

UNITED STATES PATENT OFFICE.

ISAAC BERDAN, OF CHATFIELD, MINNESOTA.

IMPROVEMENT IN SULKIES FOR PLOWS.

Specification forming part of Letters Patent No. 205,827, dated July 9, 1878; application filed May 22, 1878.

*To all whom it may concern:*

Be it known that I, ISAAC BERDAN, of Chatfield, in the county of Filmore and State of Minnesota, have invented certain new and useful Improvements in Sulkies for Plows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention consists in an extended axle formed into a crank outside of the wheels, in a slotted supporting-plate, an adjusting-arm, and a stay-chain, all arranged, in combination with the sulky frame and tongue, as will be hereinafter fully set forth.

Figure 1:
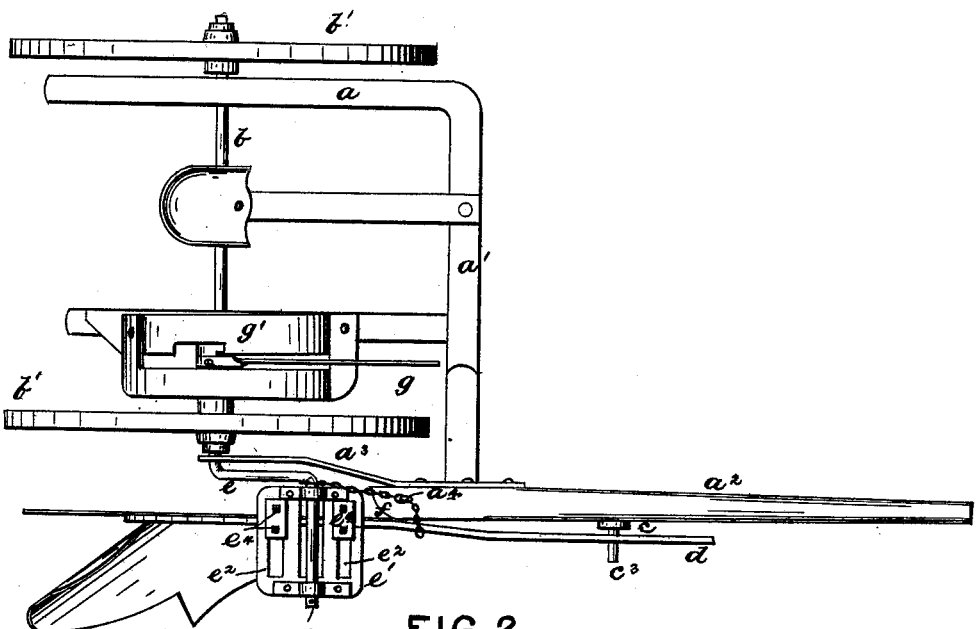
Figure 2:
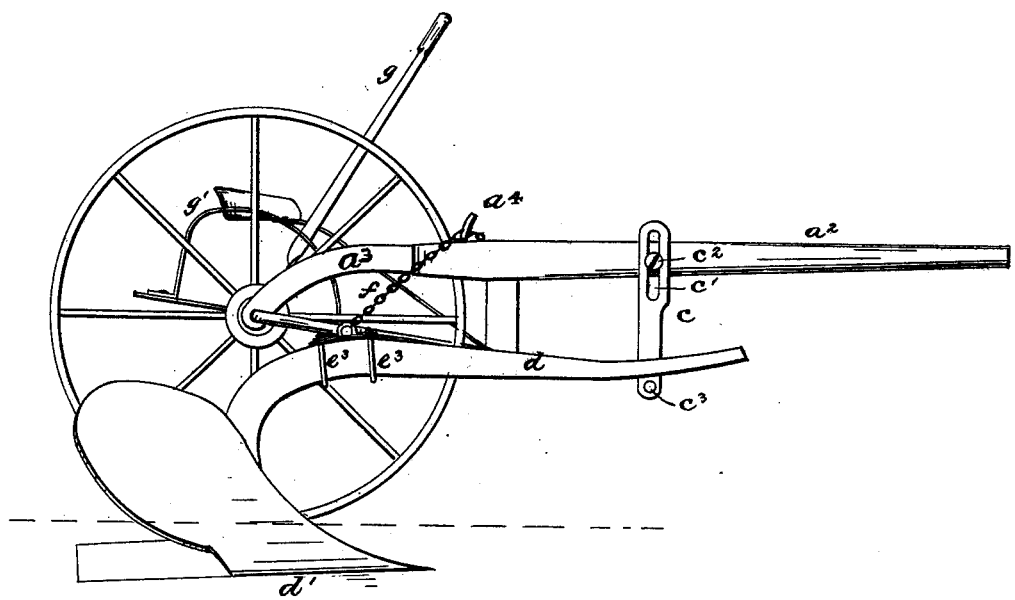

In the drawing, Figure is a plan, and Fig. 2 is a side elevation, of a sulky constructed according to my device.

$a$ is the sulky-frame supported on the axle $b$ of the wheels $b'$, as shown. The front bar $a^1$ of the frame $a$ is extended past the rim of the wheel $b'$, and has affixed on its end, and outside of said wheel, the tongue $a^2$. On the rear end of the tongue there is affixed an arm, $a^3$, which extends to and is provided with a bearing fitting on the end of the axle $b$, just outside of the hub of the wheel $b'$.

$c$ is an adjusting-arm formed with a slot, $c^1$, which permits it to be set higher or lower by a set-screw, $c^2$, on the tongue $a^2$, and it has on its lower end the horizontal pin $c^3$, which extends under and supports the forward end of the plow-beam $d$, and prevents the latter from turning downward when the plow is in use.

$e$ is a crank formed by the extension and bending of the axle $b$ outside of the wheel $b'$. On the crank $e$ is journaled a plate, $e^1$, having slots $e^2$, in which are secured the clevises $e^3$, which hold the plow-beam $d$ to the said crank.

The clevises, by means of set-nuts $e^4$, may be moved along the slots $e^2$, and thus change the distance of the plow from the sulky.

$f$ is a stay-chain, which has one end secured to the crank $e$, while its other end is constructed and adapted to be shortened or lengthened by its links hooked over the pin $a^4$ on the tongue $a^2$. By the chain $f$ the depth of the cut of the plow is regulated. Shortening the chain reduces the depth, and lengthening the chain increases the depth of the cut. The depth of the furrow may be also regulated by raising or lowering the arm $c$, which will raise or lower the beam $d$, and give a different inclination to the sole $d'$.

$g$ is a lever fixed rigidly to the axle $b$. By it the axle may be turned, and the crank $e$ elevated, and the plow lifted clear of the ground. The lever may be locked in the ratchet-bar $g'$.

The double-tree or point of draft is placed on the tongue $a^2$, slightly in rear of the point where the adjusting-arm $c$ is attached.

Having described my invention, what I claim, and desire to secure by Letters Patent, is—

The combination, with the frame $a$, tongue $a^2$, and axle $b$, extended and formed into a crank, $e$, on the outer side of the wheel $b'$, of the plate $e^1$, having slots $e^2$, adjusting-arm $c$, provided with horizontal pin $c^3$, beam $d$, attached by suitable clevises to the plate $e^1$, so that its forward end has a free vertical movement, and chain $f$, all arranged substantially as and for the purposes set forth.

In testimony that I claim the foregoing as my own I affix my signature in presence of two witnesses.

ISAAC BERDAN.

Witnesses:
S. M. OUSTINE,
I. F. O. FERRALL.